US011991811B2

(12) United States Patent
Raghavan et al.

(10) Patent No.: US 11,991,811 B2
(45) Date of Patent: May 21, 2024

(54) METHOD AND APPARATUS FOR HARVESTING A STATIC ELECTRIC CHARGE

(71) Applicant: GM Global Technology Operations LLC, Detroit, MI (US)

(72) Inventors: Madhusudan Raghavan, West Bloomfield, MI (US); Brent Thomas Deep, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 17/863,535

(22) Filed: Jul. 13, 2022

(65) Prior Publication Data

US 2024/0023222 A1 Jan. 18, 2024

(51) Int. Cl.
*H05F 7/00* (2006.01)

(52) U.S. Cl.
CPC .................................... *H05F 7/00* (2013.01)

(58) Field of Classification Search
CPC ........................................................ H05F 7/00
See application file for complete search history.

(56) References Cited

U.S. PATENT DOCUMENTS 9,331,603 B2 * 5/2016 McCowen ............... H02N 1/04
11,588,421 B1 * 2/2023 Lyden ................... H02N 99/00
2010/0007218 A1 * 1/2010 Ogram ...................... H05F 7/00 307/145
2010/0007321 A1 * 1/2010 Ogram ...................... H05F 7/00 361/111
2010/0008011 A1 * 1/2010 Ogram ..................... H01Q 1/28 361/222
2013/0093261 A1 * 4/2013 Allen ..................... H02G 13/20 307/149
2014/0042987 A1 * 2/2014 Lai ........................... H05F 7/00 320/166
2020/0015342 A1 * 1/2020 Chen ......................... H05F 7/00
2023/0187968 A1 * 6/2023 Lyden ..................... H02J 50/70 307/104

OTHER PUBLICATIONS

Choi et al., "Electrostatic Power Generation from Negatively Charged, Simulated Lunar Regolith", 2010, NASA Langley Research Center. (Year: 2010).*

* cited by examiner

*Primary Examiner* — Adi Amrany
(74) *Attorney, Agent, or Firm* — CANTOR COLBURN LLP

(57) ABSTRACT

A method and apparatus for harvesting a static electric charge from suspended particles in an atmosphere includes exposing a charge conductor to the suspended particles in the atmosphere and selectively providing a conductive path between the charge conductor and a terrestrial ground including a rechargeable energy storage device. Energy may be selectively transferred to another energy storage device.

20 Claims, 1 Drawing Sheet

METHOD AND APPARATUS FOR HARVESTING A STATIC ELECTRIC CHARGE

INTRODUCTION

The subject disclosure relates to energy harvesting of static electric charges from regolith on celestial bodies. More particularly, the disclosure is concerned with energy harvesting of static electric charges from suspended regolith on celestial bodies.

Solar energy is the primary energy source for space exploration and provides renewable energy for recharging energy storage devices on spacecraft, vehicles, and static installations for powering systems and instrumentation. Availability of solar power on celestial bodies, while predictable, may be intermittent and substantially unavailable for extended periods of time. Therefore, alternative energy sources are desirable.

Celestial bodies such as Earth's moon and Mars are known to have atmospheres supporting suspended clouds or plumes of regolith. Regolith suspension is due at least in part to static charge of the regolith particulate matter. Regolith presents a challenging environmental condition since it may be damaging to exposed surfaces including astronaut space suits, is difficult to remove from surfaces, is a breathing irritant to astronauts, and may pose risks due to charge levels which may approach several thousand volts. Therefore, avoidance or mitigation of regolith within operational areas of a space mission is desirable.

SUMMARY

In one exemplary embodiment, a method of harvesting a static electric charge from suspended particles in an atmosphere may include exposing a charge conductor to the suspended particles in the atmosphere and selectively providing a conductive path between the charge conductor and a terrestrial ground, wherein the conductive path includes a rechargeable energy storage device coupled between the charge conductor and the terrestrial ground, whereby the rechargeable energy storage device is recharged by a charge flow through the conductive path.

In addition to one or more of the features described herein, energy stored within the rechargeable energy storage device may be selectively transferred to another rechargeable energy storage device.

In addition to one or more of the features described herein, selectively transferring energy stored within the rechargeable energy storage device may include using a DC to DC converter to transfer charge from the rechargeable energy storage device to the other rechargeable energy storage device.

In addition to one or more of the features described herein, the terrestrial ground may include a celestial body outside of Earth's atmosphere.

In addition to one or more of the features described herein, exposing the charge conductor to the suspended particles in the atmosphere may include moving the charge conductor through the suspended particles in the atmosphere.

In addition to one or more of the features described herein, the charge conductor may be attached to a terrestrial vehicle and moving the charge conductor through the suspended particles in the atmosphere may include moving the terrestrial vehicle.

In another exemplary embodiment, an apparatus for harvesting a static electric charge from suspended particles in an atmosphere, may include a first rechargeable energy storage device, a second rechargeable energy storage device, a charge conductor exposed to the suspended particles in the atmosphere, and a first configuration state including a static discharge circuit having the charge conductor operatively coupled to a positive terminal of the first rechargeable energy storage device, a negative terminal of the first rechargeable energy storage device operatively coupled to a terrestrial ground, and the static discharge circuit operatively decoupled from the second rechargeable energy storage device, whereby the first rechargeable energy storage device is recharged by a charge flow through the static discharge circuit.

In addition to one or more of the features described herein, the apparatus may further include a DC to DC converter and a second configuration state including the DC to DC converter operatively coupled between the first rechargeable energy storage device and the second rechargeable energy storage device, whereby energy is transferred from the first rechargeable energy storage device to the second rechargeable energy storage device through the DC to DC converter.

In addition to one or more of the features described herein, the apparatus may further include a third configuration state including the first rechargeable energy storage device, the second rechargeable energy storage device, the DC to DC converter, the charge conductor and the terrestrial ground operatively decoupled one from another.

In addition to one or more of the features described herein, the second configuration state may further include the charge conductor operatively decoupled from the positive terminal of the first rechargeable energy storage device and the negative terminal of the first rechargeable energy storage device operatively decoupled from the terrestrial ground.

In addition to one or more of the features described herein, the first rechargeable energy storage device may include a lithium-ion battery.

In addition to one or more of the features described herein, the first rechargeable energy storage device may include a capacitor.

In addition to one or more of the features described herein, the apparatus may further include a terrestrial vehicle wherein the first rechargeable energy storage device, the second rechargeable energy storage device, and the charge conductor are carried on the vehicle.

In addition to one or more of the features described herein, the apparatus may further include at least one switch operable to selectively establish the first configuration state.

In addition to one or more of the features described herein, the apparatus may further include a plurality of switches operable to selectively establish the first configuration state, the second configuration state and the third configuration state.

In yet another exemplary embodiment, an electrified vehicle may include a first rechargeable energy storage device, an electric propulsion system including a second rechargeable energy storage device and an electric motor, a charge conductor exposed to statically charged particles in an atmosphere, a DC to DC converter, a plurality of controllable switches, a controller operatively coupled to the plurality of switches to establish a first configuration state including a static discharge circuit having the charge conductor operatively coupled to a positive terminal of the first rechargeable energy storage device, a negative terminal of the first rechargeable energy storage device operatively coupled to a terrestrial ground, and the static discharge circuit operatively decoupled from the second rechargeable energy storage device, whereby the first rechargeable energy storage device is recharged by a charge flow through the static discharge circuit, and the controller operatively coupled to the plurality of switches to establish a second configuration state including the DC to DC converter operatively coupled between the first rechargeable energy storage device and the second rechargeable energy storage device, whereby energy is transferred from the first rechargeable energy storage device to the second rechargeable energy storage device through the DC to DC converter.

In addition to one or more of the features described herein, the charge conductor may include a radiator of the vehicle.

In addition to one or more of the features described herein, the charge conductor may include a solar panel of the vehicle.

In addition to one or more of the features described herein, the charge conductor may include a robotic arm of the vehicle.

In addition to one or more of the features described herein, the first rechargeable energy storage device may be detachably mounted to the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
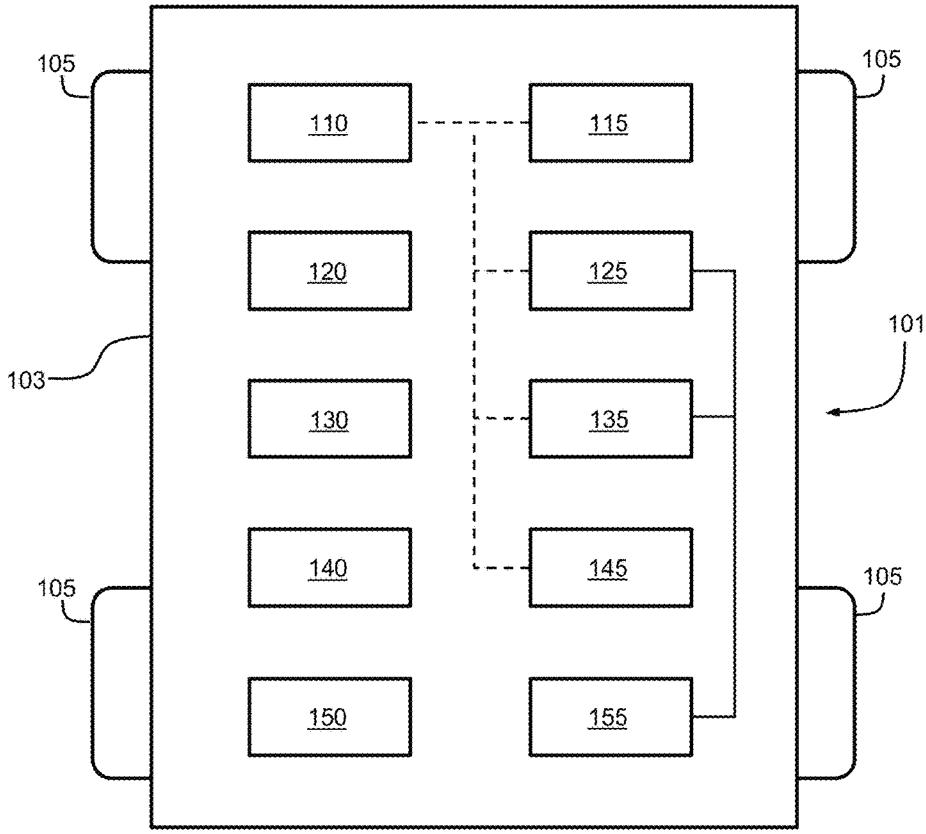
FIG. 1 illustrates a terrestrial electrified vehicle, in accordance with one or more embodiments.

The following description is merely exemplary in nature and is not intended to limit the present disclosure, its application or uses. Throughout the drawings, corresponding reference numerals indicate like or corresponding parts and features.

FIG. 1 schematically illustrates an embodiment of an electrified vehicle 101. Vehicle 101 may include a chassis 103 or other mechanical structure for attachment and carrying of vehicle systems and apparatus including, for example, powertrain components, chassis components and other components in accordance with the vehicle application purposes. The vehicle 101 in an embodiment may be a terrestrial vehicle equipped for traversing *terra firma* in space exploration applications of celestial bodies such as Earth's moon, Mars, other planets within or outside of Earth's solar system and their moons, or asteroids. A celestial body as used herein means any natural object outside of Earth's atmosphere. The vehicle 101 may have an electric propulsion system including wheels 105 driven by one or more traction motors 150. The vehicle may include a primary rechargeable energy storage device (RESD) 110 providing electrical power to vehicle systems and components such as the traction motor 150, radio communication equipment, computer-based controllers (controller) 155, power electronics and actuators. The vehicle 101 may include a radiator 120 as part of a thermal management system carried by the vehicle 101. The vehicle 101 may include a solar panel 130 for conversion of light energy to electrical energy useful for recharging the primary RESD 110. The vehicle 101 may include a robotic arm 140 for performing useful tasks on and around the vehicle 101.

It is known, for example, that the lunar surface of Earth's moon is replete with fine lunar dust or regolith, and that the regolith may be suspended in the atmosphere due to static charge of its particulates. Regolith presents a challenging environmental condition since it may be damaging to exposed surfaces including astronaut space suits, is difficult to remove from surfaces, is a breathing irritant to astronauts, and may pose risks due to charge levels which may approach several thousand volts. The vehicle 101 may be configured to harvest static electric charge in the atmosphere surrounding the celestial body upon which the vehicle 101 is deployed and, in the process, also mitigate some of the deleterious effects of regolith lofting, clinging and high charge levels. Thus, an apparatus that can harvest the static charge from suspended particulate matter may be advantageously used to supplement the energy from solar panels or as a primary energy source when solar energy is unavailable, for example during lunar nights which are substantially 14 Earth days in duration. Advantageously, such charge harvesting may be used to improve local conditions within a region wherein such harvesting is accomplished. Mobile systems associated with the vehicle 101 may be able to reduce suspended charged regolith to prepare staging areas for landing spacecraft, clean up areas subsequent to landing spacecraft, or otherwise prepare areas for manual occupation and tasks. Therefore, in accordance with an embodiment, the vehicle 101 may further include an electrical charge conductor (conductor) 145 for exposure to the suspended particles of the regolith in the atmosphere and an auxiliary RESD 115 for storing the energy from the static electric charge. In an embodiment, the auxiliary RESD 115 may be detachable from the vehicle 101 for use as an electrical power supply remote from the vehicle. In an embodiment, the vehicle 101 may further include a DC to DC converter 125 controllably operative to transfer energy from the auxiliary RESD 115 to the primary RESD 110. In an embodiment, the vehicle may include at least one controllably operative switch (switch) 135 to selectively configure a static discharge circuit through the auxiliary RESD 115 to recharge the auxiliary RESD 115. Switch as used herein may include physical contact devices such as relays or solid-state switches such as solid-state relays or transistors, for example.

One or more controllers 155 may be signally and operatively connected to the DC to DC converter 125 and the at least one switch to effect control thereof. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

In an embodiment, the at least one switch 135 may include a plurality of switches to achieve a variety of configurations among the primary RESD 110, the auxiliary RESD 115, the conductor 145, and the DC to DC converter 125 as illustrated by the dashed lines of FIG. 1. As used herein, rechargeable energy storage device may refer to an electrochemical cell or battery of electrochemical cells (battery), a capacitor, or other device capable of accepting electrical energy for storage and subsequent release. Cells and batteries may be of any suitable electrochemical topology including, for example, lithium ion with liquid, polymer, solid-state or hybrid solid-state electrolytes. In an embodiment, the conductor 145 may be a dedicated, single purpose device such as one or more conductive rods, a conductive panel, skin, coating, film, screen, inking, depositions or traces upon, or supported by, the vehicle 101 or components thereof. In an embodiment, the conductor 145 may be integrated into or upon vehicle 101 components or features, for example the chassis 103, the radiator 120, the solar panel 130, or the robotic arm 140.

Figure 2:
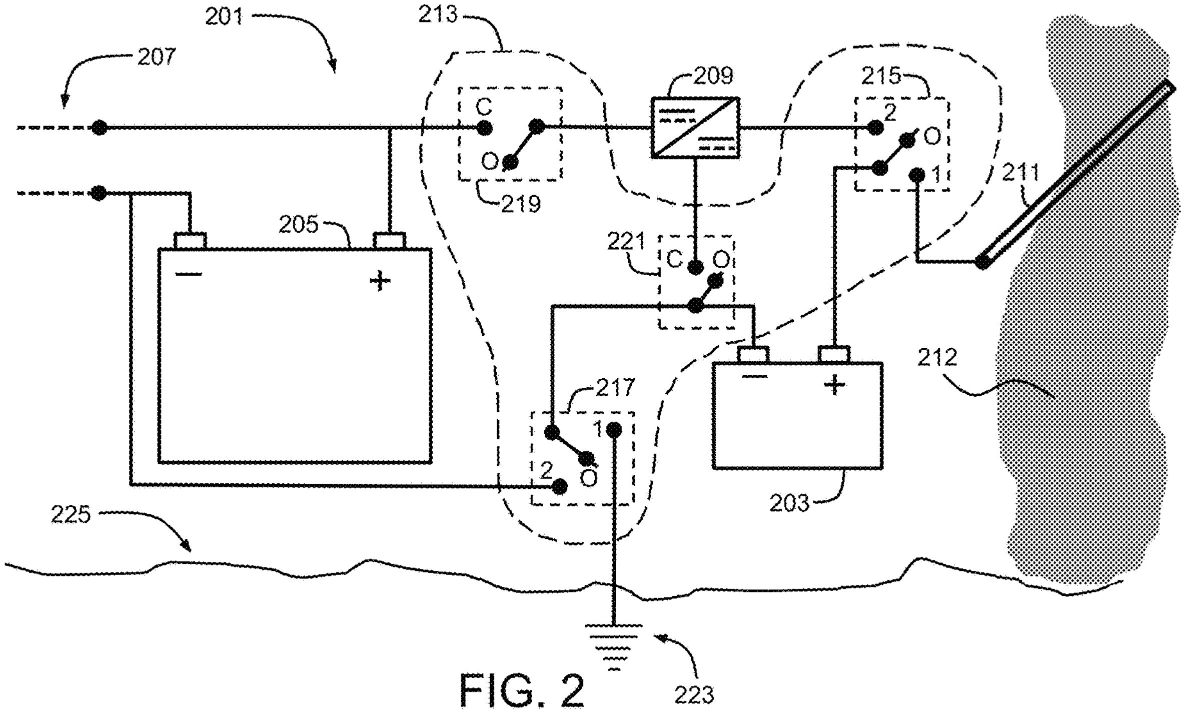
FIG. 2 illustrates an apparatus for harvesting a static electric charge, in accordance with one or more embodiments.

With reference to FIG. 2, an embodiment of an apparatus 201 for harvesting a static electric charge is illustrated. The apparatus 201 may be part of a terrestrial vehicle 101 as described herein in conjunction with FIG. 1, though it alternatively may be a static installation. The apparatus 201 may include a first RESD 203 such as an auxiliary RESD 115 and a second RESD 205 such as a primary RESD 110 described herein in conjunction with FIG. 1. In an embodiment, the second RESD 205 may provide electrical power to a DC bus 207 for powering various systems. In an embodiment, the first RESD 203 may have a nominal voltage that is less than the nominal voltage of the second RESD 205. In alternative embodiments, the first RESD 203 may have a nominal voltage that is less than or equivalent to the nominal voltage of the second RESD 205. The apparatus 201 may further include an electrical charge conductor (conductor) 211 exposed to the atmosphere and particularly to statically charged suspended particles of regolith 212. In addition to the conductor embodiments for vehicular application described herein in conjunction with FIG. 1, the conductor 211 in a static installation may be part of, or carried by, any suitable structure including a building, a pod, a frame, a spacecraft, a tower and the like. Advantageously, in either mobile or static installations, moving the conductor 211 through the regolith may allow expanded charge collection regions. For example, a movable conductor on a static installation may effect charge collection in a region surrounding the static installation. Likewise, a conductor carried on a terrestrial vehicle 101 may be exposed to regolith in a much larger area in accordance with the vehicle's range of motion and operational area. In an embodiment, at least one switch may be provided to selectively configure a static discharge circuit including the conductor 211 coupled to the positive terminal of the first RESD 203 and the negative terminal of the first RESD 203 coupled to terrestrial ground 223. In such a rudimentary configuration, the at least one switch may complete the static discharge circuit though the first RESD 203 by coupling the negative terminal of the first RESD 203 to the terrestrial ground 223 (e.g., switch 217) with the positive terminal of the first RESD 203 directly coupled to the conductor 211. Alternatively, in such a rudimentary configuration, the at least one switch may couple the positive terminal of the first RESD 203 to the conductor 211 (e.g., switch 215) with the terrestrial ground 223 directly coupled to the negative terminal of the first RESD 203. Recharging of the first RESD 203 is effected by selectively operating the at least one switch to complete the conductive path that is the static discharge circuit to flow charge through the first RESD 203. Terrestrial ground as used herein means an "earth ground" to *terra firma* 225 of the celestial body upon which the apparatus 201 is deployed, for example, the lunar surface of Earth's moon. A terrestrial ground may be established in static installations by a conductive stake embedded withing the *terra firma* or in vehicular applications by a conductive rake in contact with the *terra firma*, for example. In an embodiment of a vehicular application wherein the vehicle chassis provides an electrical system ground to negative terminals of the first RESD 203 and the second RESD 205, the terrestrial ground 223 may be established through a terrestrial grounding of the chassis.

In an embodiment, the at least one switch may be a plurality of controllably operative switches (switches) 213 and the apparatus 201 may further include a DC to DC converter 209 to enable and effect energy transfer from the first RESD 203 to the second RESD 205 by establishing a number of configurations among the first RESD 203, the second RESD 205, the conductor 211, the terrestrial ground 223 and the DC to DC converter. In an embodiment, switch 215 may be a three-state switch including a first closed state (1) coupling the positive terminal of the first RESD 203 to the conductor 211, a second closed state (2) coupling the positive terminal of the first RESD 203 to the input stage of the DC to DC converter 209, and an open state (O). In an embodiment, switch 217 may be a three-state switch including a first closed state (1) coupling the negative terminal of the first RESD 203 to the terrestrial ground 223, a second closed state (2) coupling the negative terminal of the first RESD 203 to the negative terminal of the second RESD 205, and an open state (O). In an embodiment, switch 219 may be a two-state switch including a closed state (C) coupling the output stage of the DC to DC converter 209 to the positive terminal of the second RESD 205 and an open state (O). In an embodiment, switch 221 may be a two-state switch including a closed state (C) coupling the ground of the DC to DC converter 209 to the negative terminal of the first RESD 205 and an open state (O).

In an embodiment, the DC to DC converter 209 may operate in a boost mode where the first RESD 203 nominal voltage is less than the nominal voltage of the second RESD 205. In an embodiment, the DC to DC converter 209 may operate in a buck mode where the first RESD 203 nominal voltage is greater than the nominal voltage of the second RESD 205. It is understood that a DC to DC converter may be optional in an embodiment where the first RESD 203 has a nominal voltage that is greater than the nominal voltage of the second RESD 205 sufficient to transfer energy from the first RESD 203 to the second RESD 205. However, in any embodiment employing a DC to DC converter to transfer energy from the first RESD 203 to the second RESD 205, the DC to DC converter advantageously provides a voltage regulation function. In an embodiment that does not employ a DC to DC converter 209, switch 221 may be eliminated and switches 215 and 219 may be directly coupled without the intervening DC to DC converter 209.

State Table 1 herein illustrates the switch states of switches 215, 217, 219 and 221 for establishing three configuration states of the apparatus 201 as described herein. A first configuration state includes a static discharge circuit wherein the conductor 211 is operatively coupled to the positive terminal of the first RESD 203, the negative terminal of the first rechargeable energy storage device 203 is operatively coupled to the terrestrial ground, and the static discharge circuit is operatively decoupled from the second RESD 205, whereby the first RESD 203 is recharged by a charge flow through the static discharge circuit. The first configuration state may be established by switch 215 in the first closed state (1), switch 217 in the first closed state (1), switch 219 in the open state (O) and switch 221 in the open state (O). A second configuration state includes the DC to DC converter 209 operatively coupled between the first RESD 203 and the second RESD 205, whereby energy is transferred from the first RESD 203 to the second RESD 205 through the DC to DC converter 209. The second configuration state may be established by switch 215 in the second closed state (2), switch 217 in the second closed state (2), switch 219 in the closed state (C) and switch 221 in the closed state (C). In an embodiment of the second configuration state, the static discharge circuit may remain operative with alternative or additional switches to switches 215 and 217 for example. A third configuration state includes the first RESD 203, the second RESD 205, the DC to DC converter 209, the conductor 211 and the terrestrial ground 223 are operatively decoupled one from another. The third configuration state may be established by switch 215 in the open state (O), switch 217 in the open state (O), switch 219 in the open state (O) and switch 221 in the open state (O).

State Table 1

| | Switch 215 | | | Switch 217 | | | Switch 219 | | Switch 221 | |
|---|---|---|---|---|---|---|---|---|---|---|
| | 1 | 2 | Ope | 1 | 2 | Ope | Ope | Close | Ope | Close |
| Configuration State 1 | X | | | X | | | X | | X | |
| Configuration State 2 | | X | | | X | | | X | | X |
| Configuration State 3 | | | X | | | X | X | | X | |

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of harvesting a static electric charge from suspended particles in an atmosphere using an apparatus comprising a first rechargeable energy storage device, a second rechargeable energy storage device, and a first configuration state comprising a static discharge circuit comprising the charge conductor operatively coupled to a positive terminal of the first rechargeable energy storage device, a negative terminal of the first rechargeable energy storage device operatively coupled to a terrestrial ground, and the static discharge circuit operatively decoupled from the second rechargeable energy storage device, the method comprising:

exposing the charge conductor to the suspended particles in the atmosphere; and selectively providing the conductive path between the charge conductor and the terrestrial ground by selecting the first configuration state, wherein the conductive path includes the rechargeable energy storage device coupled between the charge conductor and the terrestrial ground, whereby the rechargeable energy storage device is recharged by a charge flow through the conductive path.

2. The method of claim 1 further comprising selectively transferring energy stored within the rechargeable energy storage device to another rechargeable energy storage device.

3. The method of claim 2 wherein selectively transferring energy stored within the rechargeable energy storage device comprises using a DC to DC converter to transfer charge from the rechargeable energy storage device to the other rechargeable energy storage device.

4. The method of claim 1 wherein the terrestrial ground comprises a celestial body outside of Earth's atmosphere.

5. The method of claim 1 wherein exposing the charge conductor to the suspended particles in the atmosphere comprises moving the charge conductor through the suspended particles in the atmosphere.

6. The method of claim 5 wherein the charge conductor is attached to a terrestrial vehicle and moving the charge conductor through the suspended particles in the atmosphere comprises moving the terrestrial vehicle.

7. An apparatus for harvesting a static electric charge from suspended particles in an atmosphere, comprising:

a first rechargeable energy storage device;

a second rechargeable energy storage device;

a charge conductor exposed to the suspended particles in the atmosphere; and a first configuration state comprising a static discharge circuit comprising the charge conductor operatively coupled to a positive terminal of the first rechargeable energy storage device, a negative terminal of the first rechargeable energy storage device operatively coupled to a terrestrial ground, and the static discharge circuit operatively decoupled from the second rechargeable energy storage device, whereby the first rechargeable energy storage device is recharged by a charge flow through the static discharge circuit.

8. The apparatus of claim 7 further comprising a DC to DC converter and a second configuration state comprising the DC to DC converter operatively coupled between the first rechargeable energy storage device and the second rechargeable energy storage device, whereby energy is transferred from the first rechargeable energy storage device to the second rechargeable energy storage device through the DC to DC converter.

9. The apparatus of claim 8 further comprising a third configuration state comprising the first rechargeable energy storage device, the second rechargeable energy storage device, the DC to DC converter, the charge conductor and the terrestrial ground operatively decoupled one from another.

10. The apparatus of claim 9 further comprising a plurality of switches operable to selectively establish the first configuration state, the second configuration state and the third configuration state.

11. The apparatus of claim 8 wherein the second configuration state further comprises the charge conductor operatively decoupled from the positive terminal of the first rechargeable energy storage device and the negative terminal of the first rechargeable energy storage device operatively decoupled from the terrestrial ground.

12. The apparatus of claim 7 wherein the first rechargeable energy storage device comprises a lithium-ion battery.

13. The apparatus of claim 7 wherein the first rechargeable energy storage device comprises a capacitor.

14. The apparatus of claim 7 further comprising a terrestrial vehicle wherein the first rechargeable energy storage device, the second rechargeable energy storage device, and the charge conductor are carried on the vehicle.

15. The apparatus of claim 7 further comprising at least one switch operable to selectively establish the first configuration state.

16. An electrified vehicle, comprising:

a first rechargeable energy storage device;

an electric propulsion system including a second rechargeable energy storage device and an electric motor;

a charge conductor exposed to statically charged particles in an atmosphere;

a DC to DC converter;

a plurality of controllable switches;

a controller operatively coupled to the plurality of switches to establish a first configuration state comprising a static discharge circuit comprising the charge conductor operatively coupled to a positive terminal of the first rechargeable energy storage device, a negative terminal of the first rechargeable energy storage device operatively coupled to a terrestrial ground, and the static discharge circuit operatively decoupled from the second rechargeable energy storage device, whereby the first rechargeable energy storage device is recharged by a charge flow through the static discharge circuit; and the controller operatively coupled to the plurality of switches to establish a second configuration state comprising the DC to DC converter operatively coupled between the first rechargeable energy storage device and the second rechargeable energy storage device, whereby energy is transferred from the first rechargeable energy storage device to the second rechargeable energy storage device through the DC to DC converter.

17. The vehicle of claim 16 wherein the charge conductor comprises a radiator of the vehicle.

18. The vehicle of claim 17 wherein the charge conductor comprises a solar panel of the vehicle.

19. The vehicle of claim 17 wherein the charge conductor comprises a robotic arm of the vehicle.

20. The vehicle of claim 17 wherein the first rechargeable energy storage device is detachably mounted to the vehicle.

* * * * *